March 19, 1963  G. R. HEFFNER ETAL  3,081,487
ELASTOMERIC FOAM PRODUCING APPARATUS
Filed June 30, 1960  8 Sheets-Sheet 2

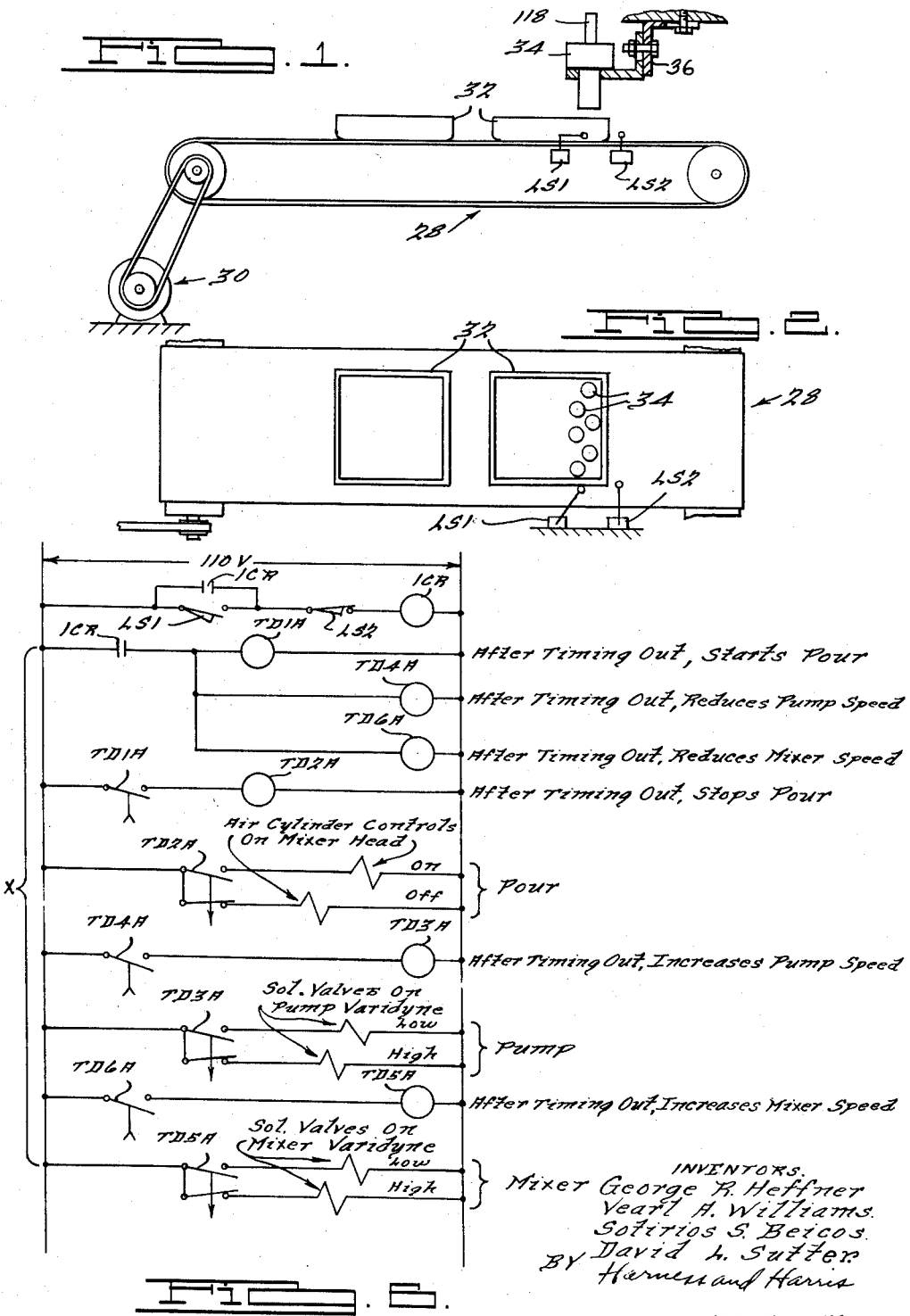

INVENTORS
George R. Heffner
Vearl A. Williams
Sotirios S. Beicos
David L. Sutter
BY Harness and Harris
ATTORNEYS

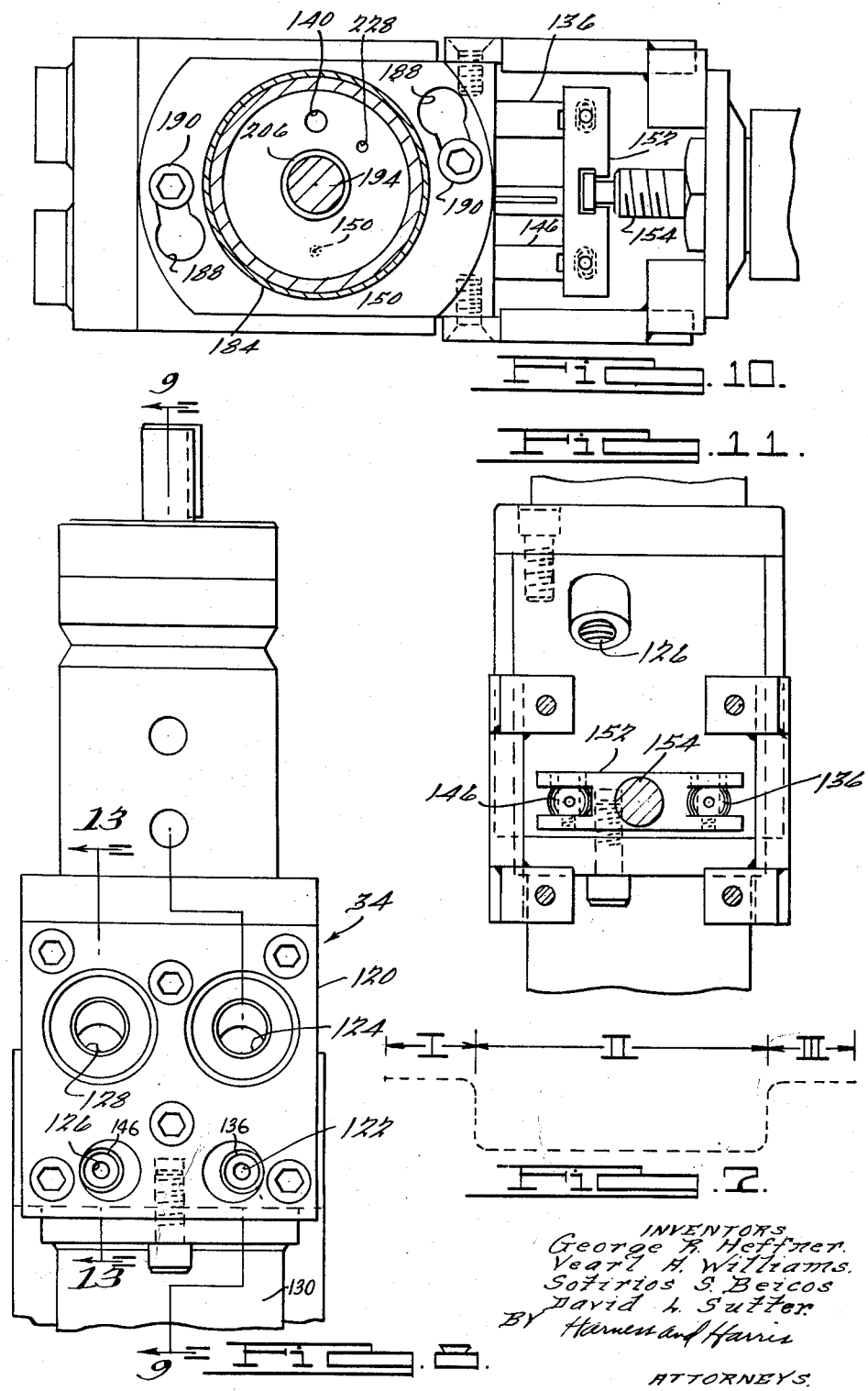

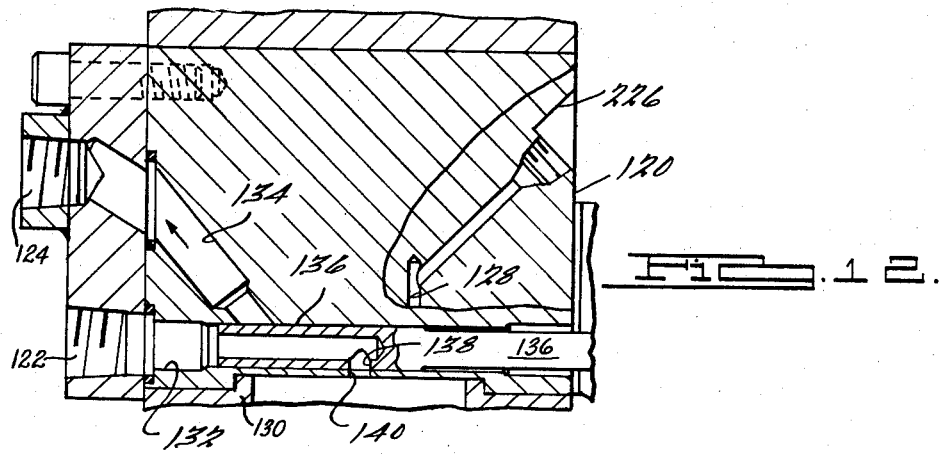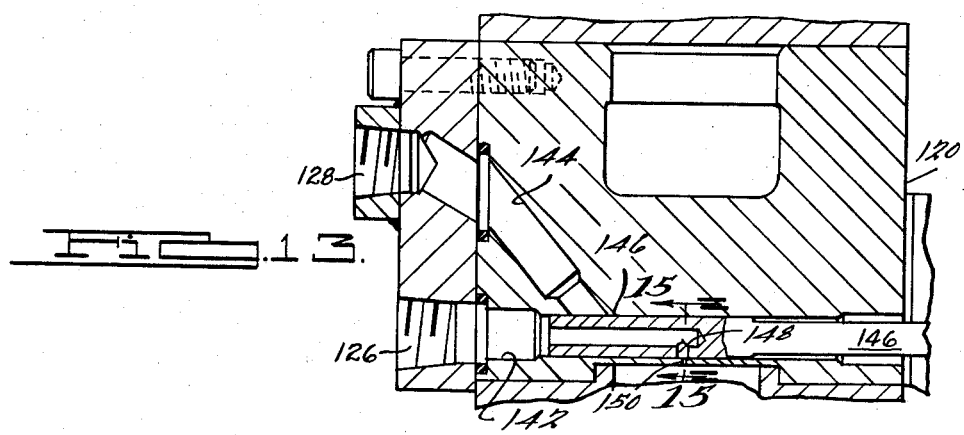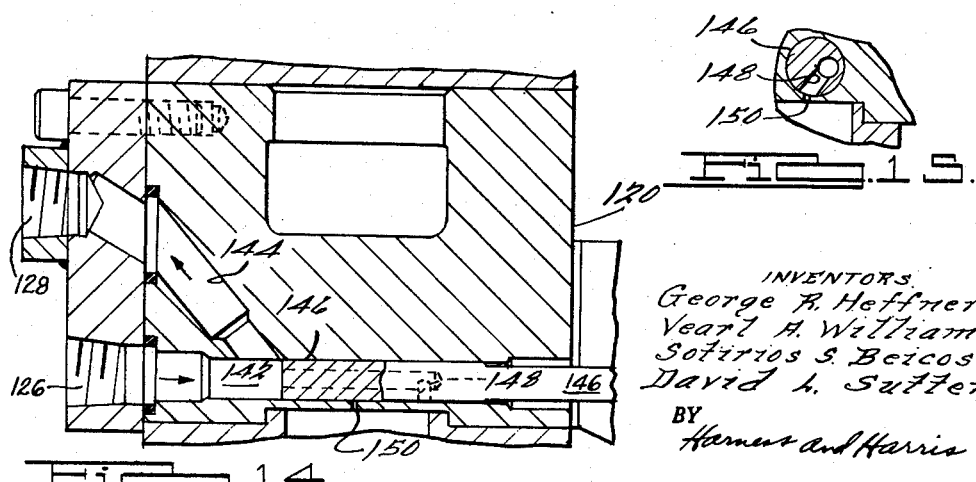

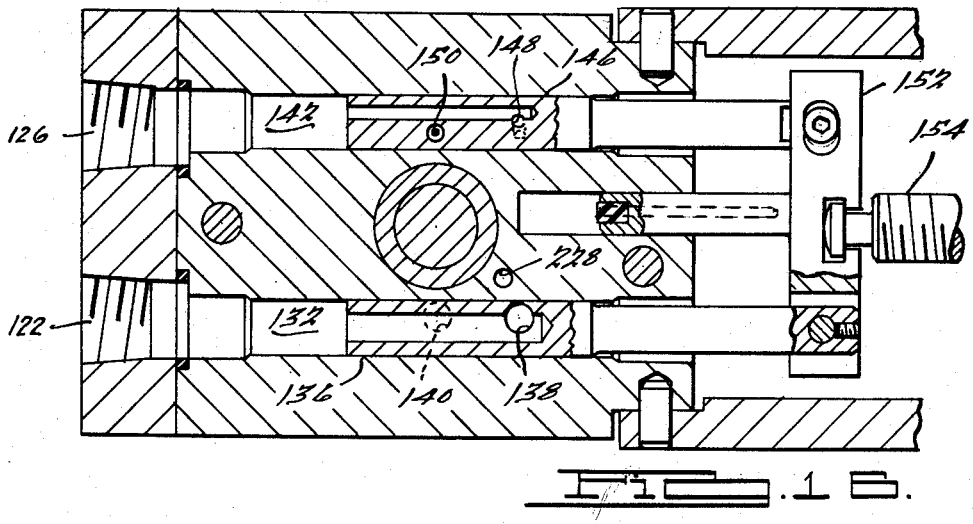

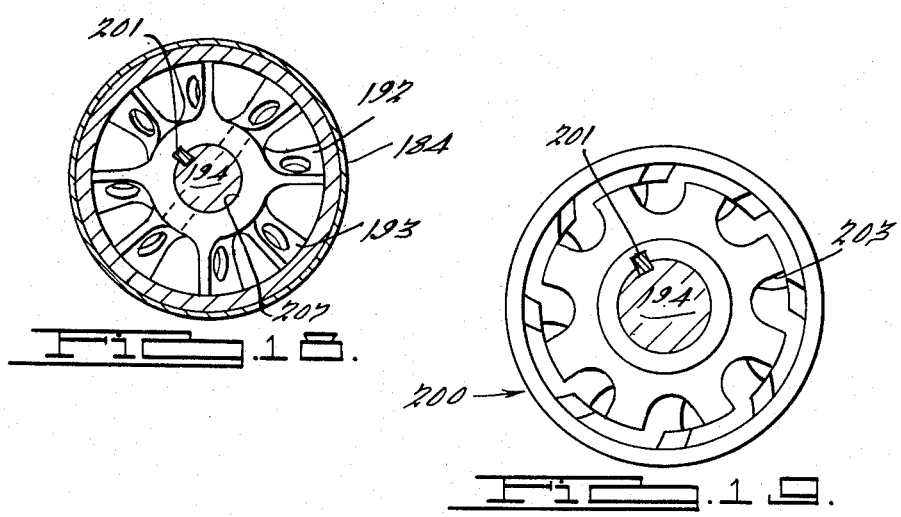
FIG. 18.
FIG. 19.
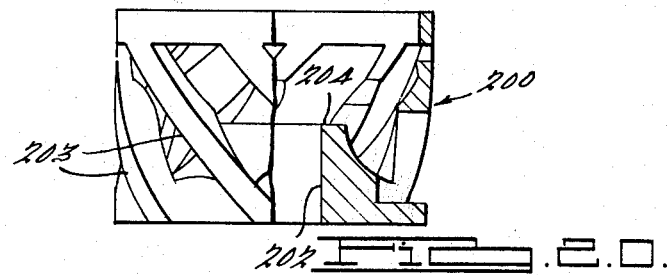
FIG. 20.
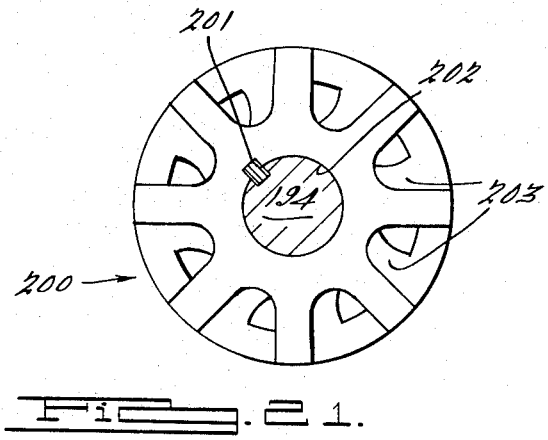
FIG. 21.
INVENTORS.
George R. Heffner.
Veart H. Williams.
Sotirios S. Beicos.
David L. Sutter.
BY
Harness and Harris
ATTORNEYS.

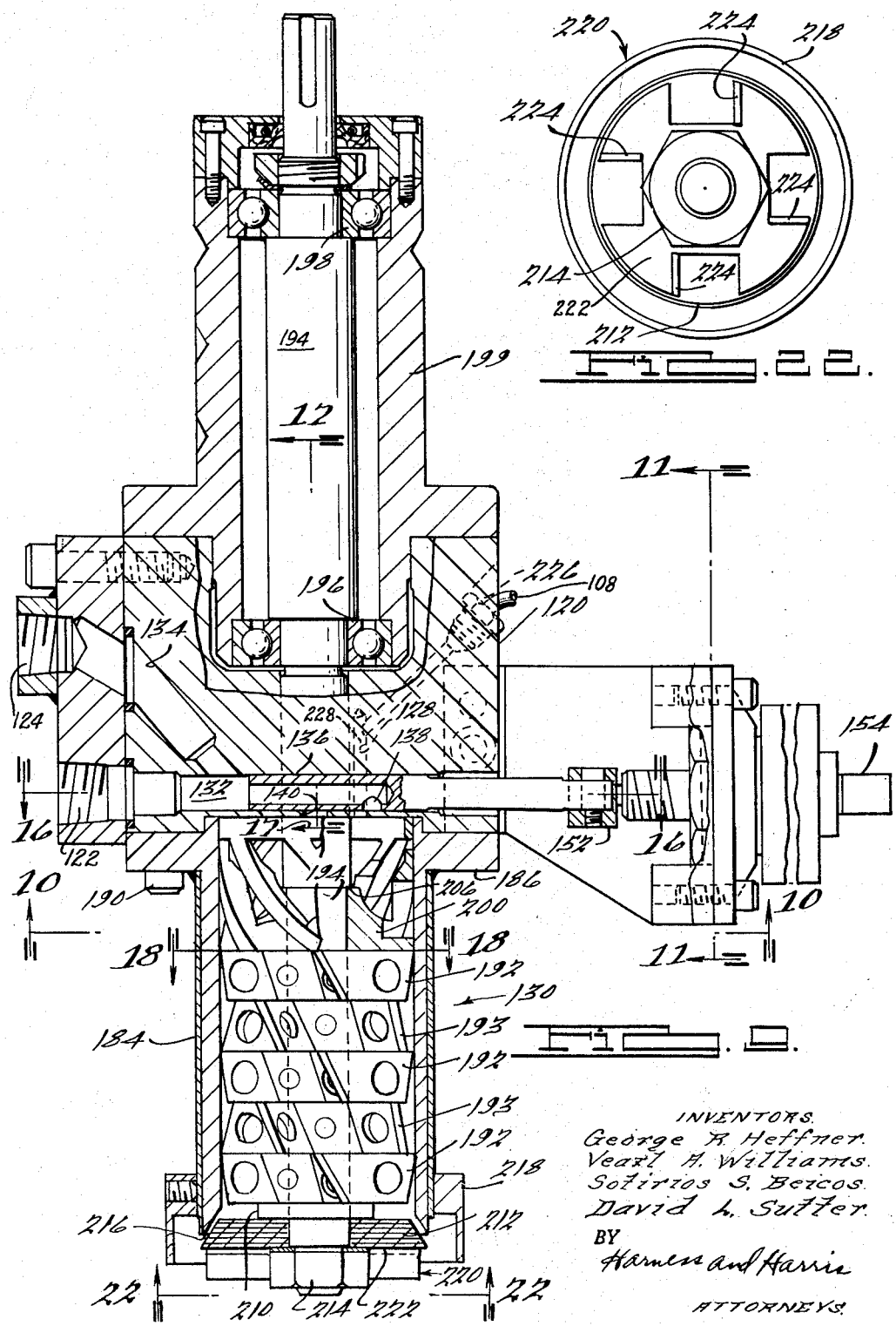

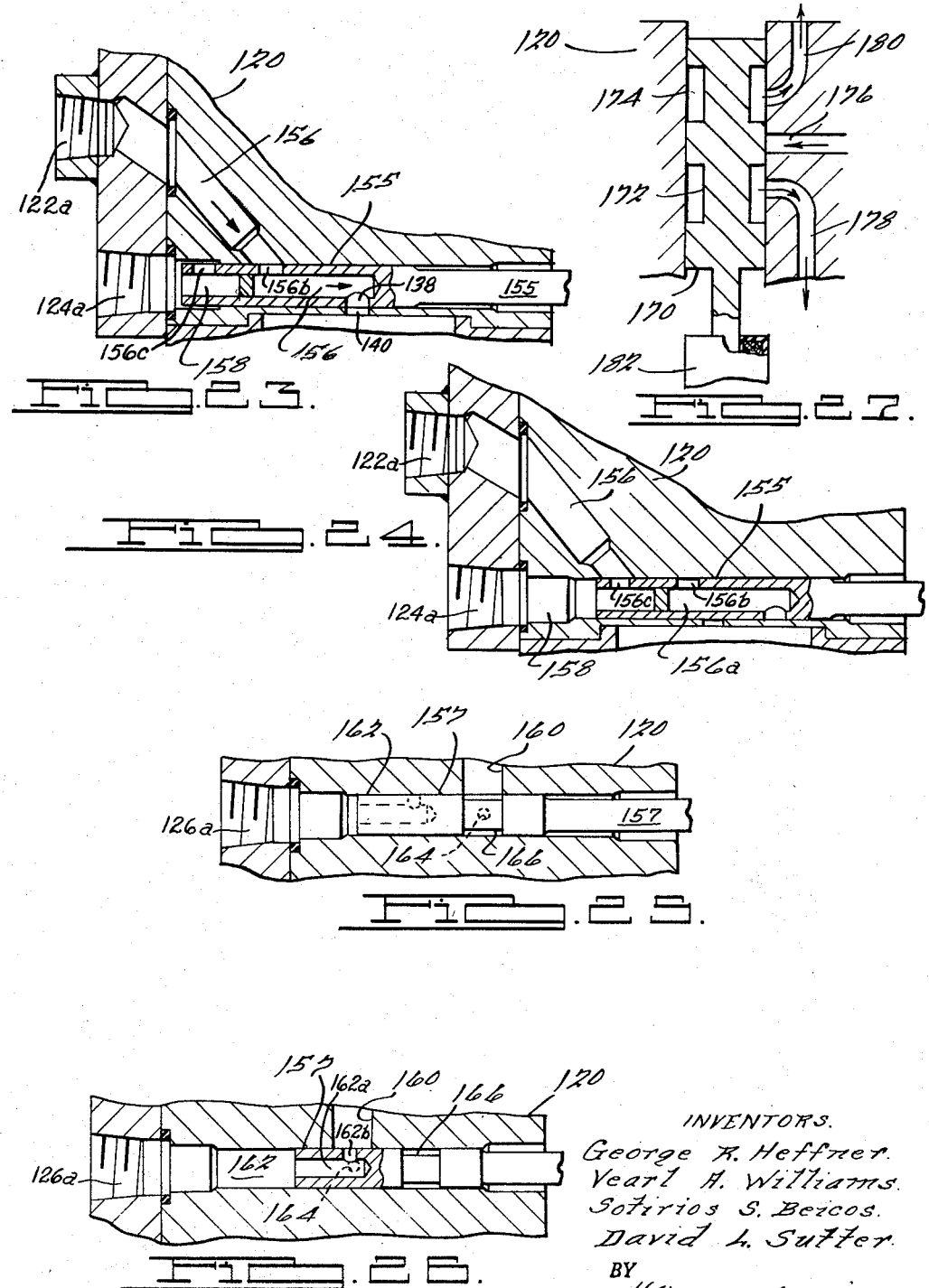

United States Patent Office 3,081,487
Patented Mar. 19, 1963

3,081,487
ELASTOMERIC FOAM PRODUCING APPARATUS
George R. Heffner, Grosse Ile Township, Wayne County, Vearl A. Williams, Berkley, Sotirios S. Beicos, Detroit, and David L. Sutter, Birmingham, Mich., assignors to Chrysler Corporation, Highland Park, Mich., a corporation of Delaware
Filed June 30, 1960, Ser. No. 40,075
15 Claims. (Cl. 18—4)

This invention relates to a polyurethane foam dispensing apparatus whereby a variety of patterns of foam may be rapidly distributed to produce a plurality of articles having substantially identical density characteristics.

Heretofore, polyurethane foam producing apparatus have usually consisted of one dispensing head which is moved in a reciprocating manner over the mold to achieve the desired foam distribution pattern. Among the disadvantages of this type of apparatus is its limited ability to control accurately the foam distribution within each operating cycle, and its limited ability to rapidly reproduce a series of distribution patterns for production line molding of contoured articles such as seat pads desirably having substantially the same contour, size, and density characteristics.

The present invention utilizes a plurality of foam dispensing units or heads which are adapted for adjustment relative to each other prior to pouring to produce a predetermined distribution pattern in three dimensions without the necessity of moving the heads during the pouring cycle. Provided for each head are foam component feed means and component mixing means which are individually adjustable to provide a feeding cycle for each of the units independently of each other unit which cycles correspond to a particular foam product of predetermined characteristics.

A principal object of this invention is to provide a polyurethane foam producing apparatus which can produce a variety of accurately controlled distribution patterns to produce in turn molded foam articles of uniform density regardless of changes in mold thickness or contour.

A further and particular object is to provide a polyurethane foam producing apparatus which utilizes a plurality of stationary pouring units which are adjustably mounted with respect to each other, and further to provide each of these units with foam component feed means and component mixing means which are individually adjustable and adjustable independently of other feed and mixing means to vary the component feed to the separate units during the pouring cycle according to a predetermined pattern based on local changes in mold cavity contour.

Another object is to provide a multi-head elastomeric foam producing apparatus capable of mass producing molded elastomeric articles having accurately controlled shapes and densities.

Further objects and advantages will become apparent from the following description and drawings, in which:

FIGURE 1 represents a schematic view of the conveyor system positioned with respect to the pouring units;

FIGURE 2 represents a top view of FIGURE 1;

FIGURE 6 represents an electrical control circuit unit for operating the foam component feed systems for each head;

FIGURE 7 represents a typical pour cycle;

FIGURE 8 represents a front view of the foam dispensing head;

FIGURE 9 represents a cross-sectional view of the dispensing unit taken along the line 9—9 of FIGURE 8 in the direction of the arrows;

FIGURE 10 represents a view of the mixer unit of FIGURE 9 taken along the line 10—10 thereof in the direction of the arrows with the pumping basket removed;

FIGURE 11 represents a view of the dispensing unit of FIGURE 9 taken along the line 11—11 thereof in the direction of the arrows;

FIGURE 12 represents a view of the resin valve structure of the unit of FIGURE 9 shown in its pour position;

FIGURE 13 represents a view of the unit of FIGURE 8 taken along the line 13—13 thereof in the direction of the arrows;

FIGURE 14 represents a view of the unit of FIGURE 13 with the catalyst valve in its bypass position;

FIGURE 15 represents a cross-sectional view of the catalyst valve of FIGURE 13 taken along the line 15—15 thereof in the direction of the arrows;

FIGURE 16 represents a view of the unit of FIGURE 9 taken along the line 16—16 thereof in the direction of the arrows;

FIGURE 17 represents a view of the unit of FIGURE 9 taken along the line 17—17 thereof in the direction of the arrows;

FIGURE 18 is a view of the mixer of FIGURE 9 taken along the line 18—18 thereof in the direction of the arrows;

FIGURE 19 represents a top view of the pumping basket of FIGURE 9;

FIGURE 20 represents a partial cross-sectional side view of the pumping basket;

FIGURE 21 represents a bottom view of the pumping basket;

FIGURE 22 represents a bottom view of the fan of FIGURE 9 viewed along the line 22—22 thereof in the direction of the arrows;

FIGURES 23 and 24 represent a variation of the prepolymer valve;

FIGURES 25 and 26 represent a variation of the catalyst valve; and

FIGURE 27 represents a land type valve finding application in the present type of apparatus as a substitute for the prior prepolymer and catalyst valves.

Figure 3:
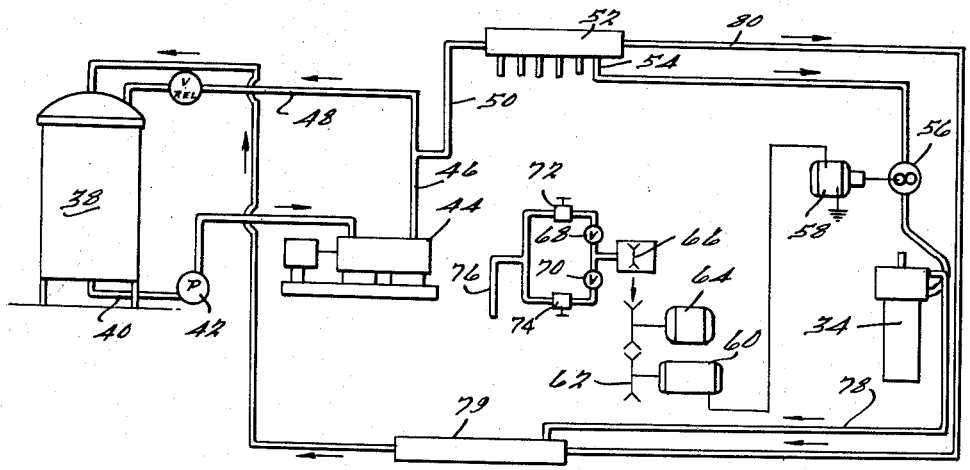
FIGURE 3 represents a schematic view of the prepolymer feed system of the apparatus.

Referring to FIGURES 1 and 2 of the drawings, a conveyor 28 which may be powered by an adjustable speed drive unit 30 is designed to carry a plurality of mold sections 32 for receiving polyurethane foam from heads 34. This conveyor system and molds therefor are only one adaptation of the dispensing apparatus to be hereinafter described, and it is also contemplated that a continuous feed of the foam may be made onto a continuous mold for a variety of applications. Whatever the mold size or shape, the apparatus to be described below may be conveniently used to produce foam of a variety of desired contours, thickness, and densities for a variety of applications of the product.

The foam dispensing system consists of a plurality of dispensing or pouring heads designated 34, each of which may be adjustably mounted on an adjustably positionable bridge 36 or other structure positioned over the conveyor 28. These heads are adapted for positioning movement with respect to the other units depending on the width of the desired foam distribution pattern. Any number of these dispensing units may be employed according to the present invention.

This invention provides for the manufacture of urethane foams by the "prepolymer" method, wherein individual streams of "prepolymer" and a suitable catalyst are pumped to each head as described below.

The prepolymer may comprise the reaction product of a suitable resin and toluene diisocyanate mixed with a silicone emulsifier. The chemical variations of the prepolymer are numerous and could all be effectively handled by the present apparatus; therefore, the apparatus should be considered as capable of producing any type of polyurethane foam. In addition, the apparatus should be considered as capable of producing urethane foams by the "one-shot" method, which merely would involve addition of pumps to the foam component feed means and modification of valving hereinafter described in the pouring units. In the one-shot system, no pre-reaction (prepolymerization) has taken place prior to introduction of the foam components to the pouring unit; rather, components are fed to the pouring units in individual streams or pre-mixed streams, and reaction of the components first starts in the mixing portion of the pouring unit.

Referring to FIGURE 3, the prepolymer supply system is shown to consist of a prepolymer storage tank 38 having an outlet line 40 connected to a pump 42 and to a heat exchanger 44 for maintaining the temperature and viscosity of the prepolymer substantially constant. The outlet 46 of the heat exchanger has two branches, 48 being the return line to the prepolymer storage tank and branch 50 feeding the prepolymer to a prepolymer supply manifold 52. A plurality of outlet lines 54 extend from the manifold 52 to the inlet side of separate feed pumps 56. These feed pumps feed the prepolymer to each of the heads 34 according to electrically driven motors 58 connected to each of these pumps.

The speed of each of the motors 58 is controlled by separate alternators 60 having variable speed pulleys which spread apart and reduce their diameters when the tension of the belts driving them is increased. Each of these alternators is driven by a motor 64 which is linked to the pulley 62 of the alternators and to a pneumatically operated positioning idle pulley 66 such as a "Varitrol" unit made by U.S. Electrical Motors Company. The position of the idle pulleys and hence the tension on the drive belts is controlled by the solenoid valves 68 and 70, which respectively control the flow of high pressure air and low pressure air to the pneumatic positioner. The pressure of the air in the high and low pressure lines is set by the regulators 72 and 74, respectively. Line 76 supplies air under pressure to each of the pressure regulators. When the high pressure solenoid valve 68 is actuated by its timing mechanism in a manner to be hereinafter explained the low pressure solenoid 70 is de-actuated and the high pressure air is allowed to position pulley 66 such that the diameter of the pulley 62 of the alternator is reduced a predetermined amount to increase the speed of motor 58 a predetermined amount. This increase in speed of motor 58 will increase the flow of prepolymer to the head 34 as required by the characteristics of the flow cycle. A bypass line 78 connects the head to the prepolymer return manifold 79 when the head is not dispensing foam. Since excess resin is constantly supplied to the delivery manifold 52 another bypass line 80 connects manifold 52 to manifold 79 to return the excess prepolymer to the storage tank 38. It is noted that each of the heads 34 is connected to the common supply manifold 52 but they are provided with separate pumps 56 and variable speed drive mechanisms therefor. In this manner it is seen that the prepolymer flow rate to each of the heads may be separately regulated according to any flow cycle desired.

Figure 4:
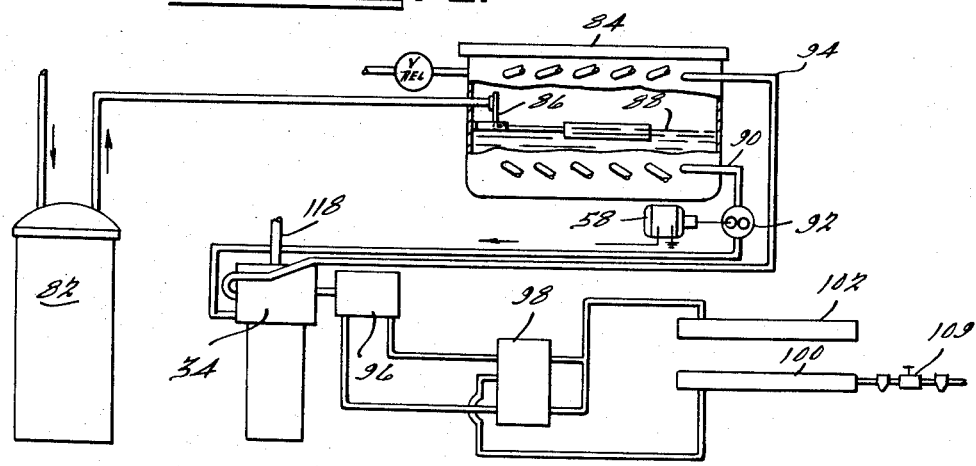
FIGURE 4 represents a schematic view of the catalyst feed system.

Referring to FIGURE 4, a catalyst flow system is shown for each of the heads 34 and comprises a catalyst storage tank 82 having the catalyst therein under air pressure which forces the catalyst into the catalyst supply manifold 84 when the float valve 86 is opened by a drop in the level 88 of the catalyst in said manifold. The catalyst system comprises a conventional amine such as hexamethylenediamine in water. A plurality of catalyst feed lines 90 connect each of the heads 34 to the catalyst manifold through individual catalyst metering pumps 92 which may conveniently be driven by the motors 58 which drive the prepolymer pumps 56 associated with that particular head. In other words, the flow cycle for the catalyst and the resin are identical insofar as proportional delivery is concerned over the operation cycles of the present invention. However, should added flexibility of the system be desired, separate pump motors for the prepolymer and the catalyst could be employed. A plurality of catalyst return lines 94 provide bypass means for each of the heads 34 when the heads are in the "off" pour position. The "on" and "off" pour positions of the heads 34 are controlled by separate, double-acting cylinders 96 which are controlled by appropriate double-acting four-way solenoid valves 98 operatively connected to lubricated air intake manifold 100 and an exhaust air manifold 102.

Figure 5:
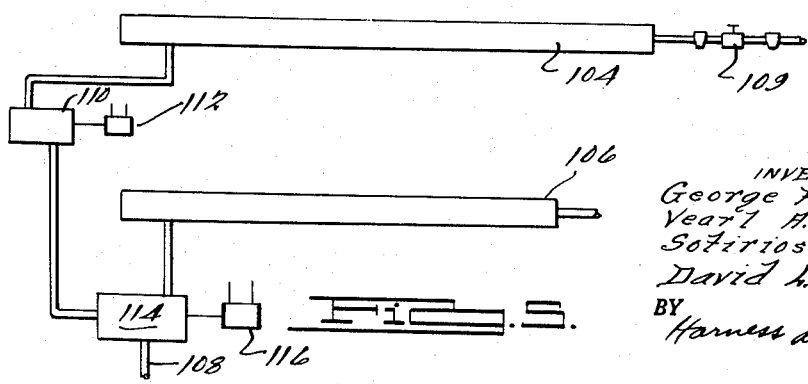
FIGURE 5 represents a schematic view of the solvent system.

Shown in FIGURE 5, a flush air manifold 104 and a solvent manifold 106, both of which are pressurized, are connected to a common line 108 for selectively flushing the mixer portions of each of the heads 34 with either air or solvent or both as desired. The flow of air is controlled by pressure regulator 109, valve 110, and solenoid 112, and the flow of solvent is controlled by a valve 114 and solenoid 116. The actuation of solenoids 112 and 116 may be build into an automatic cycling system or may be by operation of a manually operated electrical switch.

Further referring to FIGURE 4, the mixer for physically intermixing the foam components is provided with a drive shaft 118 which is driven by a variable speed set-up which may be identical to that shown for driving the pumps 56 and 96. The electrical actuating or cycling system for controlling the resin flow, catalyst flow, and mixer speed is described below.

Referring to FIGURES 6 and 7, diagrammatic circuitry for controlling the cycle of operation, and a representative cycle of operation for a single pouring unit are shown. The cycle shown in FIGURE 7 by the dotted line which represents an initial high foam flow and a terminal high foam flow separated by an intermediate low foam flow is shown. The operation of the electrical circuit for providing this cycle is shown in FIGURE 6 and operates in the following manner:

A normally open switch designated LS1 (FIGURES 2 and 6) is closed by each mold section 32 as it moves along the conveyer 28. When LS1 closes a main relay 1CR is energized, which immediately energizes time delay relays TD1A, TD4A, and TD6A. These time delay relays are all of the pneumatic type as is well known in the art, for example, Class 8991, type ATO9 manufactured by Square D Company of Milwaukee, Wisconsin. When TD1A times out, a contact therein is closed and energizes TD2A which actuates the "on" solenoid of the solenoid actuated air valve 98 to allow air to flow to the cylinder 96 and move the prepolymer and catalyst flow valves in the head 34 to the "pour" position. The prepolymer and catalyst feed systems and the mixer speed control are at this time in their "high" positions and result in the high foam flow shown in the initial section I of FIGURE 7. At the instant that the time delay relays 4A and 6A time out and switch the contacts of the time delay relays 3A and 5A to the low speed position the high flow section I of the cycle has been completed, and the low flow section II of the cycle begins. During the low flow section II of the cycle, switch LS2, which is normally closed is opened by the mold sections 32 and immediately deenergizes 1CR and time delay relays TD1A, TD4A and TD6A. The low flow section of the cycle continues until time delay relays TD3A and TD5A time out and the pump and mixer drive motors revert to high speed. The high flow section of the cycle continues until time delay relay TD2A has timed out and its contacts revert to the "off pour" position to move the catalyst and prepolymer flow control valves in the head to the "off" position. This circuitry and cycle has been described for only one head, but the same basic system is multiplied any number of times to accommodate any number of heads. In order to accomplish this, the desired number of basic electrical circuit units X, as shown in FIGURE 6, are added in parallel with unit X. It is particularly noted that the time delay relays 1A, 2A, 3A, 4A, 5A, and 6A may all be set to time out at different times to give any desired cycle for each head independently of each other head.

Referring to FIGURES 8 through 17, the mixing head 34 comprises a prepolymer-catalyst valve section 120 having a prepolymer inlet 122 and outlet 124, and a catalyst inlet 126 and outlet 128. The other section 130 of the head 34 contains the mixer. Section 120 is provided with a prepolymer bypass system connected to the inlet 122 and outlet 124 and is also provided with a catalyst bypass system connected to the inlet 126 and outlet 128. The prepolymer bypass system comprises conduits 132 and 134 which conduits are disconnected by operation of a prepolymer valve member 136 slidably mounted in the conduit 132 and movable to a position covering the junction of 132 and 134 while simultaneously aligning passages 138 and 140 to allow the prepolymer to flow into the mixer 130 as shown in FIGURE 12.

The catalyst bypass systems shown in FIGURES 14 and 15 comprise the conduits 142 and 144, which are similarly disconnected when valve member 146 is moved to a position aligning passage 148 with passage 150 to allow the catalyst to flow to the mixer. Valve members 136 and 146 are connected to a common yoke 152, which is connected to the piston member 154 of the double acting pneumatic cylinder 96. Alternate valve designs are shown in FIGURES 23 through 27.

FIGURES 23 and 24 represent respectively the "on" and "bypass" positions of the alternate prepolymer valve 155, while FIGURES 25 and 26 represent respectively the "on" and "bypass" positions of the alternate catalyst valve 157. The prepolymer valve conduit ysstem comprises a prepolymer inlet 122a, conduits 156, 156a, and connecting port 156b, the latter in valve member 155 and an outlet conduit 158 connecting with the conduit 156 by a port 156c and with the exterior of the head by an outlet 124a. The catalyst valve conduit system comprises the catalyst inlet conduit 160 and an inlet (not shown) corresponding to the prepolymer inlet 122a, and an outlet conduit 162 connecting with outlet 126a by a passage 162a and a port 162b in the valve member 157. The connection of the inlet conduit 160 to the catalyst port 164 leading to the mixer is in the form of an annular groove 166 in the catalyst valve member 157.

Referring to FIGURE 27, the prepolymer valve and the catalyst valve may alternatively be made in the form of the shuttle valve member 170, having an annular bypass groove 172, and an annular mixer feed groove 174 therein. Movement of the shuttle valve in one direction will connect the feed conduit 176 with the bypass return conduit 178, and movement in the other direction will connect the feed conduit 176 to the mixer feed conduit 180. This type of valve could conveniently be connected either directly to a double acting solenoid 182 or through suitable leverage for its actuation.

Should it be desirable to produce the foam by a one shot operation the basic foam ingredients of water, catalyst, resin, and toluene di-isocyanate may be brought together for the first time in the mixing chamber. In such a system it would be an obvious variation of the component feed and valve structure to provide additional feed lines, pumps, and valves to produce separate feed systems for each of these components. Moreover, the cycling of these feed systems could be separately controlled in the manner shown for the prepolymer and catalyst systems.

Referring to FIGURES 9, 10 and 18 through 21, the mixer section 130 comprises a housing 184 which may have a flange 186 with bayonet type slots (FIGURE 10) therein to receive bolts 190 threadedly received in the valve section 120. Two sets of identical shaped impeller blades 192 and 193 are secured to shaft 194 which is mounted in bearings 196 and 198 supported in spindle housing 199. A pumping basket 200 as shown in FIGURES 19 through 21 is provided with a central bore 202 for receiving the shaft 194, and a shoulder 204 for abutting shoulder 206 on the shaft 194 to limit the upward movement of the basket thereon. The basket is keyed to the shaft by key means 201. Helical portions 203 of the basket when rotated clockwise tend to pump the foam constituents downwardly. The impeller blades 192 and 193 having bores 207 for receiving the shaft 194 are keyed to the shaft by key means 201 and are alternately, angularly displaced from each other as shown in FIGURE 18 and compressed between the basket 200 and washer 210. Each of these blades may have several keyways therein to allow them to be positioned with respect to each other around the shaft to compensate for various characteristics such as viscosity of the particular foam components being used. Upward force is exerted on the washer 210 by a stack of laminations 212, which are compressed together by nut 214 threaded on the end of shaft 194. The number of laminations of the stack 212 determines the size of annular gap 216 between the end of the housing 184 and the lamination stack 212. This gap size will affect the pressure drop between the mixer and the atmosphere and thereby affect the velocity of the discharged foam. In this manner, the shape of the tube of foam being ejected from the head can be altered. An annular section 218 may be provided adjacent the gap 216 to prevent high velocity foam from spraying outwardly by the centrifugal action of the lamination stack 210. Located intermediate the lamination stack 212 and the nut 214 is a fan 220 shown in FIGURES 9 and 22 comprising a flat plate 222 from which four identical blades 224 extend downwardly. These blades are adapted to increase the pressure within the discharge foam cone to increase the diameter thereof.

Referring to FIGURES 5 and 9, the outlet 108 of the solvent and air cleaning system may be connected to port 226 which port communicates with the mixing unit 130 through passage (FIGURE 10). This cleaning system as mentioned above may be included into the circuit of FIGURE 6 and made to operate by time delay mechanisms according to any desired cycle.

We claim:
1. In a polyurethane foam producing apparatus having a mold conveyor system, a plurality of pouring heads adjustably positioned with respect to said conveyor system, speed adjustable mixing means in each said head, adjusting means for separately varying the speed of each said mixing means, timer means for controlling the operating cycle of each said adjusting means independently of each other adjusting means, foam pouring valve means in each of said heads, actuating means operatively connected to each said valve means of each said head and operable to actuate each said valve means independently of each other valve means, timer means operably connected to each said actuating means for controlling the operation thereof independently of each other timer means.

2. In a polyurethane foam producing apparatus having a mold conveyor system, a plurality of mixing heads adjustably positioned with respect to said conveyor system, adjustable speed mixing means in each said head, speed adjusting means operatively connected to each of said mixing means to separately adjust the speed of each said mixing means, separate first timer means to independently control the operating cycle of each said adjusting means, foam pouring valve means in each of said heads, actuating means operatively connected to each said valve means of each said head and operable to actuate said valve independently of each other actuating menas, second timer means operably connected to each said actuating means for independently controlling the operation of each actuating means, and switching means associated with said conveyor system for initiating the operation of each said timer means.

3. An apparatus for producing foamed articles of predetermined surface contour and density comprising mold means on which to form said articles, a plurality of pouring heads arranged in predetermined space relationship across said mold means and operable together to pour a selective three-dimensional pattern of foam on said mold means to produce said articles, feeding means for supplying foam components to each of said heads, control means operable upon said feeding means for controlling the rate of flow of said components to each of said heads, separate valve means associated with each of said heads for controlling the flow of foam components through said heads and cycling means for controlling the operation of said control means and valve means and thereby the pour of said components by said heads for effectuating said selective pattern.

4. An apparatus for producing foamed articles of predetermined surface contour and density comprising mold means on which to form said articles, a plurality of pouring heads arranged in predetermined space relationship across said mold means and operable together to pour a selective three-dimensional pattern of foam on said mold means to produce said articles, said heads being positionable with respect to each other to alter the width of the distribution pattern, feeding means for supplying foam components to each of said heads, control means operable upon said feeding means for controlling the rate of flow of said components to each of said heads, independently operable valve means associated with each of said heads for controlling the flow of said components through each head independently of each other head, and cycling means for controlling the operation of said control means and valve means and thereby the pour of said components by said heads for effecting said selective pattern.

5. An apparatus for producing foamed articles of predetermined surface contour and density comprising mold means on which to form said articles, a plurality of pouring heads arranged in predetermined space relationship across said mold means and operable together to pour a selective three-dimensional pattern of foam on said mold means, to produce said articles, said heads being movable with respect to each other to selectively alter the distribution pattern, feeding means for supplying foam components to each of said heads, control means operable upon said feeding means for controlling the rate of flow of said components to each of said heads, independently operable valve means associated with each of said heads for controlling the flow of said components through each head independently of each other head, and independently operable cycling means for controlling the operation of said control means and valve means and thereby the pour of said components by said heads for effecting said selective pattern.

6. An apparatus for producing foamed articles of predetermined surface contour and density comprising mold means on which to form said articles, a plurality of pouring heads arranged in predetermined space relationship across said mold means and operable together to pour a selective three-dimensional pattern of foam on said mold means to produce said articles, independently cycled feeding means for supplying foam components to each of said heads at flow rates varying within the pouring cycle, independently operable valve means associated with each of said heads, and cycling means for controlling each said feeding means and valve means for controlling the feeding and pouring cycle of said heads.

7. An apparatus for producing foamed articles of predetermined surface contour and density comprising mold means on which to form said articles, a plurality of pouring heads arranged in a predetermined space relationship across said mold means and operable together to pour a selective three-dimensional pattern of foam on said mold means to produce said articles, means for moving said mold means past said heads, independently cycled feeding means for feeding foam components to each of said heads according to a predetermined cycle, independently operable valve means associated with each of said heads for controlling flow of said components through said heads, cycling means for each of said feeding means and valve means for controlling the pouring cycles of said heads, and switch means for effecting actuation of said cycling means at a predetermined position of said mold means with respect to said heads.

8. In a polyurethane foam product producing apparatus including a mold conveyor system carrying mold means on which to form said product, a plurality of mixing heads in predetermined positions transversely with respect to said mold means, means for feeding foam producing components to said heads, foam component feed valve means in each of said heads for controlling flow of said components through said heads, separate valve actuating means operatively connected to each of said valve means each operable to actuate its valve means independently of each other actuating means, separate control valve means for controlling operation of each of said valve actuating means and a plurality of timer means each operably associated with one of said control valve means for controlling the operation of said control valve means independently of each other timer means.

9. In a polyurethane foam product producing apparatus including a mold conveyor system carrying mold means on which to form said product, a plurality of mixing heads adjustably positioned with respect to said mold means, each of said heads having a foam component mixing chamber, means for feeding foam producing components to said mixing chambers, separate foam component feed passages in each of said heads for receiving said components from said feeding means, valve means in each of said heads for operatively interconnecting said passages within said heads with said mixing chambers therein, valve actuating means operatively connected to said valve means of each head and operable to actuate each said valve means independently of each other valve means, timer means for each actuating means operable for controlling the cycle of operation of its associated actuating means independently of each other timer means, and switching means associated with said conveyor system for initiating the operation of each said timer means.

10. An apparatus for producing elastomeric foamed articles of predetermined surface contour and density comprising mold means on which to form said articles, a plurality of pouring heads arranged relative to each other and adapted to deliver foam producing ingredients to said mold means in accordance with a three-dimensional distribution pattern of foam to produce said articles, each of said heads having a mixing chamber, feeding means for each head for supplying metered amounts of foam forming ingredients to each of said heads, means operable upon said feeding means for controlling the rate of delivery of said ingredients by said feeding means, timer means for each of said rate controlling means for controlling the operating cycle of said rate controlling means, mixing means in said chambers of said heads for mixing said foam forming ingredients supplied thereto, means operable upon said mixing means for controlling the rate of mixing of said ingredients, timer means for controlling the operating cycle of each of said mixing means, valve means operable between each said feeding means and the pouring head it feeds for controlling the flow of said ingredients to said mixing chambers, and timer means for controlling the operating cycle of each of said valve means.

11. Apparatus as claimed in claim 10 wherein said mixing chambers have adjustable discharge outlets.

12. Apparatus as claimed in claim 10 wherein said mixing means includes separate pumping means and impeller means.

13. Apparatus as claimed in claim 10 wherein said mixing chambers have discharge outlets and wherein said mixing means have fan-like means arranged thereon adjacent the discharge outlets for producing a tubular discharge of the mixed ingredients.

14. An apparatus for producing a foamed article the body portion of which is of substantially uniform density and composed of sections of different depth, comprising mold means on which to form such an article, means for moving said mold means, a plurality of pouring heads arranged in adjacency to each other at predetermined positions across the path of movement of said mold means and operable together to pour upon said mold a selective three-dimensional distribution pattern of foam material to produce said article, feeding means for supplying the components for producing said foam material to each of said heads, control means operable upon said feeding means for effecting a substantially uniform feed of said components at a predetermined rate to each of said heads, valve means associated with each of said heads for controlling the beginning and end of flow of said foam components to said heads by said feeding means, and rate-changing means operable upon said control means for said feeding means for changing the rate of feed of said components to said heads by said feeding means during a complete pouring cycle of said heads in the making of said article whereby to produce in the body thereof during said cycle sections of different depth.

15. An apparatus for producing a foamed article the body portion of which is of substantially uniform density and composed of sections of different depth comprising mold means on which to form such an article, means for moving said mold means, a plurality of pouring heads arranged in adjacency to each other at predetermined positions across the path of movement of said mold means and operable together to pour upon said mold a selective three-dimensional distribution pattern of foam material to produce said article, feeding means for supplying the components for producing said foam material to each of said heads, control means operable upon said feeding means for effecting a substantially uniform feed of said components to each of said heads, at a predetermined rate, valve means associated with each of said heads for controlling the beginning and end of flow of said foam components to said heads by said feeding means, timing means for controlling said operations of said valve means, rate-changing means operable upon said control means for said feeding means for changing the rate of feed of said components to said heads by said feeding means during a complete pouring cycle of said heads in the making of said article whereby to produce in the body thereof during said cycle sections of different depth and timing means for controlling operation of said rate changing means.

References Cited in the file of this patent

UNITED STATES PATENTS

| | | |
|---|---|---|
| 2,256,660 | Watts | Sept. 23, 1941 |
| 2,549,864 | Toulmin | Apr. 24, 1951 |
| 2,788,953 | Schneider | Apr. 16, 1957 |
| 2,791,353 | Dorn | May 7, 1957 |
| 2,827,665 | Rogers | Mar. 25, 1958 |
| 2,841,205 | Bird | July 1, 1958 |
| 2,958,516 | Wall et al. | Nov. 1, 1960 |
| 2,990,380 | Auerbach et al. | June 27, 1961 |
| 3,013,924 | Taft et al. | Dec. 19, 1961 |